United States Patent [19]
Furukawa et al.

[11] 3,852,393
[45] Dec. 3, 1974

[54] RESINOUS COMPOSITION COMPRISING A BLEND OF AN ABS RESIN AND POLYCARBONATE RESIN

[75] Inventors: Shogi Furukawa; Yuzo Sonoyama; Akira Ohi, all of Osaka, Japan

[73] Assignee: Daicel Ltd., Higashi-ku, Osaka, Japan

[22] Filed: Oct. 5, 1972

[21] Appl. No.: 295,118

[30] Foreign Application Priority Data
Oct. 6, 1971    Japan.............................. 46-78562

[52] U.S. Cl...... 260/873, 260/45.7 R, 260/45.75 R, 260/45.95, 260/DIG. 24
[51] Int. Cl............................................ C08g 39/10
[58] Field of Search.......... 260/873, 45.95, DIG. 24, 260/47 XA, 45.75 R, 45.7 R

[56] References Cited
UNITED STATES PATENTS
3,649,712    3/1972    Grabowski........................ 260/873
3,758,640    9/1973    Thorpe ............................. 260/873

Primary Examiner—Melvin Goldstein
Assistant Examiner—T. Pertilla
Attorney, Agent, or Firm—Woodhams, Blanchard and Flynn

[57] ABSTRACT

An impact-resistant composition comprising a blend of (1) an ABS resin prepared by the so-called bulk suspension polymerization, and (2) a polycarbonate resin, and a flame-resistant resin composition which is formed by incorporating into said impact-resistance resin composition a halogen compound and antimony trioxide as flame retardant.

15 Claims, No Drawings

RESINOUS COMPOSITION COMPRISING A BLEND OF AN ABS RESIN AND POLYCARBONATE RESIN

BACKGROUND OF THE INVENTION

1. Field of the Invention

This invention relates to an impact-resistant resin composition and to an impact-resistant resin composition that does not support combustion.

2. Description of the Prior Art

Processes now in use for the preparation of ABS (acrylonitrile-butadiene-styrene) resins are roughly categorized into the following two methods.

One is a so-called emulsion polymerization method comprising mixing a monomer such as styrene and acrylonitrile in the emulsified state with a rubber which is also in the emulsified state, and polymerizing the mixture. The other is the so-called bulk suspension polymerization method comprising dissolving rubber into monomer such as a mixture of styrene and acrylonitrile, subjecting the solution to bulk polymerization, suspending the polymeric liquor in water in the middle of the polymerization, and then continuing the polymerization under suspension polymerization conditions.

Both methods are identical in the point that there is obtained a polymer in which the monomer is grafted to the rubber molecule, but it is considered that they are different in various points such as the ratio of the monomer to be graft-polymerized, the distribution state of the grafted monomer on the rubber molecule, the molecular weight of the graft-polymerized portion and the distribution state of the grafted portion in the polymer.

Accordingly, polymers formed by these two methods are identical in that they have substantial impact resistance, but a difference is observed between the two polymers with respect to flowability and the like and also with respect to the gloss of the molded article, which latter property is considered to indicate the dispersion state of the rubber.

U.S. Pat. No. 3,130,177 discloses the characteristic feature that the melt index of a resin composition formed by blending an ABS resin with a polycarbonate resin is improved as compared with the melt index of each constituent resin. However, it is observed that in said composition the impact resistance tends to be lowered by blending of both resins.

A known thermoplastic resin composition obtained by graft-polymerizing styrene or α-methylstyrene or a mixture thereof with acrylonitrile in the presence of a diene-type elastomer is very excellent in such properties as impact resistance and tensile strength, and resin compositions of this type have been used in great quantity in various fields. But, because of their defect of being readily combustible, the use of such compositions involves a great problem in some fields, for instance, when they are used as engineering plastics.

Some compositions have been marketed as flame-resistant, impact-resistant resinous materials, but in many cases, extreme reduction or lowering of physical properties such as impact resistance, tensile strength and heat resistance is brought about by making the compositions flame-resistant, and the commercial merits of the resins are lost. And, commercially available ABS resins called "flame-resistant" do not surpass such conventional products.

In general, it is more difficult to make polyolefins and vinyl polymers flame-resistant, than it is to make flame-resistant polyurethanes and celluloses or polyesters, which burn while forming carbides. Particularly, in the case of polymers containing a diene-type elastomer, such as ABS resins, it is very difficult to make them flame-resistant, and in order to obtain a sufficient effect, it is necessary to incorporate a great quantity of a flame retardant in such polymers. Incorporation of a great quantity of a flame retardant results in extreme reduction of the physical properties, as mentioned above. Thus, in polymers of this type, development of satisfactory products has been demanded.

Many methods have heretofore been proposed to impart flame resistance to resin compositions. One of them is a method comprising polymerizing a flame-resistant monomer having a halogen substituent or copolymerizing such halogen-substituted monomer with other monomer. Another method comprises incorporating into the resin one or more halogen-containing compounds, phosphorus-containing compounds, and antimony trioxide or the like.

The former method is not practical from the economical viewpoint because the synthesis of halogen-substituted monomers, with some exceptions (vinyl chloride, ethylene fluoride, etc.) is industrially difficult and because, if synthesis is possible, many technical problems are brought about concerning the copolymerizability with other monomer, the polymer growth-inhibiting activity and the chain transfer activity.

On the other hand, as is seen from many patent specifications, the latter method does not involve such difficult technical problems in preparing flame-resistant resins on an industrial scale.

However, if a flame retardant is added to an impact-resistant resin composition, especially an ABS resin, in an amount sufficient to make the resin self-extinguishing (incapable of supporting combustion), as mentioned above, not only the impact resistance but also the softening point is extremely reduced. This is a great obstacle in the art, and the development of a resin demanded in the art, namely a resin having both heat resistance and flame resistance in combustion, is hindered by said obstacle.

As a method for improving the softening point of an ABS resin there may be considered, for instance, a process disclosed in the above-mentioned U.S. patent that comprises incorporating a suitable amount of a polycarbonate into an ABS resin. It is known that polycarbonates are resins having high tensile strength and impact resistance and good dimension stability, and that they exhibit an excellent temperature resistance as compared with other thermoplastic resins.

Therefore, it may be considered that flame-resistant and impact-resistant resins having excellent physical properties can be obtained by blending a polycarbonate into an ABS resin to form a resin composition having high impact resistance and high heat resistance in combination and incorporating therein an effective flame retardant.

However, as is illustrated in the above patent, in order to obtain a resin composition having desired properties by blending a graft-copolymeric ABS resin prepared by the so-called emulsion polymerization method with a polycarbonate, it is necessary to effect the kneading operation at 220°C. by employing a Banbury mixer and then continue the kneading by means of a roll mill until the composition becomes homogeneous.

Accordingly, if a halogen compound is incorporated as one component of the flame retardant into a blend of such ABS resin and polycarbonate and the kneading is carried out, the heat effect on the flame retardant becomes considerable, and the halogen compound is almost completely colored or decomposed violently, with the result that the intended object of rendering the resin flame-resistant is not attained and, moreover, an undesired phenomenon of accelerating the decomposition of the ABS resin or polycarbonate resin is brought about.

BRIEF STATEMENT OF THE INVENTION

We have discovered that an ABS resin formed by the bulk-suspension, graft-polymerization method, when blended with a polycarbonate resin, possesses peculiar and unexpected qualities compared with an ABS resin formed by the emulsion, graft-polymerization method.

We have found that when a polycarbonate resin is blended with such an ABS resin prepared by the bulk suspension polymerization method, the resulting composition exhibits greatly different properties from the composition disclosed in said U.S. patent which comprises an ABS resin prepared by the emulsion polymerization method, that the two products are considered to be substances quite different from each other. Such differences are summarized as follows, although these differences are illustrated in more detail in the Examples given hereinbelow.

i. Flowability

A novel composition of this invention comprising an ABS resin formed by the bulk suspension polymerization method and a polycarbonate has a melt viscosity which varies almost in proportion to the mixing ratio of both resins, and the flowability is therefore unexpectedly different from that emphasized in the invention of said U.S. patent.

ii. Impact Resistance

In the case of an ABS resin formed by the emulsion polymerization method, a lowering of the impact resistance is observed, and the dependency of the impact resistance on the molding method is extremely high. On the other hand, in the case of an ABS resin formed by the bulk suspension polymerization method, the impact resistance is improved by the blending of a polycarbonate resin, particularly when the polycarbonate is blended in an amount of more than 25 percent by weight in the mixture. Further, the dependency of the impact resistance on the molding method is not seen at all.

iii. Compounding Property

In the composition comprising an ABS resin formed by the emulsion polymerization method, a maximum value of the impact resistance cannot be obtained unless the ABS resin is compounded with a polycarbonate resin by employing a strong kneading machine such as a Banbury mixer as disclosed in said U.S. patent, and, in case a simple ordinary extruder is used, the impact resistance value of the compounded blend is much lower than the impact resistance of each constituent resin alone. On the other hand, to our great surprise, a sufficient impact resistance can be obtained by conducting the kneading by employing a customary simple extruder in the case of compositions comprising an ABS resin formed by the bulk suspension polymerization.

It is considered that the degree of dispersion of polymers at the blending thereof is, in general, greatly dependent on how effectively the mechanical kneading stress (so-called shear stress) acts on each portion of the materials being blended, and it is presumed that the physical properties of the blended product are determined by complicated mechanisms in which molecular, physical and mechanical factors are intimately interrelated with one another.

It is difficult to elucidate readily the reason why an ABS resin prepared by the bulk suspension polymerization mehtod exhibits a peculiar behavior which is unexpectedly different from the behavior of an ABS resin formed by the emulsion polymerization method, when the respective resins are blended with a polycarbonate resin. But, it might be considered that the difference of compatibility of the respective ABS resins with a polycarbonate resin would be caused due to the following structural difference. Namely, rubber particles of the ABS resin obtained by the emulsion polymerization method are found under an electron microscope to have a size of 0.2 to $1\mu$ and to be composed of closely entangled high molecular chains of the rubber. On the other hand, the rubber particles of the ABS resin obtained by the bulk suspension polymerization method have a size of $0.5 - 2\mu$, and entanglements of high molecular chains of a copolymer of acrylonitrile with styrene or $\alpha$-methylstyrene constituting the matrix are scattered in such particles so as to form a so-called multiple structure.

The "ABS resin prepared by bulk suspension polymerization" employed in this invention means a product obtained by dissolving a butadiene type rubber, such as polybutadiene or a butadiene-stryene copolymer, into a mixture of a vinyl cyano compound represented by acrylonitrile and a vinyl aromatic hydrocarbon (including a halogenated compound) represented by styrene, polymerizing the mixture substantially under bulk polymerization conditions, although a small amount of water can be present in some cases, under such a high agitation as to shear the rubber being precipitated as polymerization advances, until 10 – 40 percent by weight of the vinyl cyano compound and vinyl aromatic compound are polymerized, and then adding water and a suspension stabilizer to the polymerization system and continuing the polymerization under the suspension polymerization conditions until the polymerization is substantially completed. The amount of the rubber to the total amount of the monomer mixture (styrene plus acrylonitrile) is 1 – 50 wt. percent, preferably 2 – 20 wt. percent. The ratio of styrene to acrylonitrile is 85 to 65 percent by weight of styrene to 15 to 35 percent by weight of acrylonitrile. Of course, in the actual working of this invention some change or modification may be allowed, and graft polymers formed by such modified method are included within the term "ABS resin prepared by bulk suspension polymerization" according to this invention. In order to practice this invention most effectively, it is desired to employ as the butadiene-type rubber a butadiene-styrene copolymer prepared by the solution polymerization using an organic metal compound as a catalyst. More specifically, use of a rubber of the solution polymerization type gives better transparency and less coloration to the product as compared with the use of a rubber of the emulsion polymerization type, and the use of a butadiene-styrene copolymer gives better transparency, higher tensile strength, better surface gloss and higher softening point to the product as compared with the use of polybutadiene.

As the above vinyl aromatic hydrocarbon compound, α-substituted styrenes such as α-methylstyrene, nucleus-substituted styrene such as vinyltoluene and o-chlorostyrene and α-methylvinyltoluene can be used by replacing styrene, preferably in an amount less than styrene.

Similarly, as the above vinyl cyano compound, a part of acrylonitrile can be replaced by methacrylonitrile.

We have noted that an ABS resin formed by the bulk suspension polymerization method can readily be compounded with a polycarbonate resin with a less heat effect than in the case of an ABS resin formed by the emulsion polymerization method, and have found that when a halogen compound is incorporated at the time of blending the ABS resin and the polycarbonate, decomposition or coloration of the halogen compound hardly occurs.

It has also been found that, although in an ABS resin formed by the emulsion polymerization method, the impact resistance is not greatly improved by the incorporation of a polycarbonate resin, the impact resistance of an ABS resin formed by the bulk suspension polymerization method is highly improved by the incorporation of a polycarbonate resin, particularly when the polycarbonate resin is blended in an amount of more than 25 percent by wt. in the mixture. Hence, this improvement of the impact resistance can fully compensate for any reduction of the impact resistance caused by the incorporation of a flame retardant, such as a halogen compound, as well as the reduction of thermal characteristics, such as the heat distortion temperature, with the result that there can be obtained a flame-resistant composition which retains the excellent physical properties inherent to the ABS resin.

The polycarbonate resin can be a polycarbonate of a di-(monohydroxyphenyl)-substituted aliphatic hydrocarbon, represented by 2,2-(4,4'-dihydroxy-diphenyl) propane (Bisphenol-A). The polycarbonates are made by converting di-(monohydroxyphenyl)-substituted aliphatic hydrocarbons with phosgene in a manner well known in the art (refer to British Pat. No. 772,627, for example).

The ratio of polycarbonate to ABS graft copolymer is preferably 25 to 70 percent by weight of a polycarbonate to 75 to 30 percent by weight of a graft copolymer. If the ratio of the polycarbonate exceeds 70 percent by weight, the melt viscosity of the blend will become too high for the fabrication of shaped articles.

As the halogen compound to be incorporated in the composition, there can be employed, for instance, a halogenated hydrocarbon compound such as tetrabromobisphenol A, decachlorobiphenyl, decabromobiphenyl, tetrabromophthalic anhydride, hexabromobenzene, tetrabromobutane, pentabromotoluene, tetrabromoaniline and tetrabromoethane. However, the halogen compound to be used in this invention is not limited to those exemplified above. Among them, tetrabromo-bisphenol A and decachlorobiphenyl exhibit an excellent flame-retarding effect.

In case a desired high flame resistance or complete non-flammability is not attained by employing such halogen compound alone, it is possible additionally to use antimony trioxide in the composition. In this case, the above-mentioned characteristic physical properties are not at all lost and the flame-retarding effect is greatly improved. In this embodiment, a preferred composition comprises 1 – 20 parts by weight of tetrabromobisphenol A, 0 – 20 parts by weight of decachlorobiphenyl and 1 – 10 parts by weight of antimony trioxide per 100 parts by weight of the blend of an ABS resin and a polycarbonate resin.

In case a resinous composition having the same formulation as above is prepared by employing a powdery ABS resin formed by the emulsion polymerization method, as is seen from the data of Comparative Examples shown in Table 3 given hereinbelow, a violent decomposition of the flame retardant occurs and the resulting resin composition is colored and does not exhibit any self-extinguishing property.

The blends of this invention can be processed by injection molding, calendering, vacuum forming, extrusion, and similar known techniques to produce molded articles.

DETAILED DESCRIPTION OF THE INVENTION

This invention will now be illustrated by reference to Examples, but this invention is not at all limited by these Examples.

Preparation A-1 (Preparation of ABS Resin by Bulk Suspension Polymerization)

Pearly ABS resins were prepared by the following bulk suspension polymerization method.

A reactor of a capacity of 120 liters equipped with a strong agitation mechanism (such as a reactor disclosed in Japanese Patent Publication No. 34150/70) was charged with a rubber solution having the following formulation ("parts" in Examples are all on a weight basis):

| | |
|---|---|
| Styrene | 72 parts |
| Acrylonitrile | 28 parts |
| Tufden 2000 A (butadiene-styrene copolymer rubber manufactured by Asahi Kasei) | 15 parts |
| Dibenzoyl peroxide | 0.15 part |
| Dicumyl peroxide | 0.10 part |
| t-Dodecyl mercaptan | 0.33 part |
| Butylbenzyl phthalate | 3 parts |
| Water | 20 parts |

The atmosphere inside the reactor was replaced by nitrogen, and the bulk polymerization was carried out at a polymerization temperature of 73°C. for 3 hours and 30 minutes and the agitator was rotated at 600 rpm. The reaction mixture preliminarily bulk-polymerized by the above-mentioned procedure was fed into a pressure reactor (having a capacity of 250 liters) charged in advance with an aqueous suspension of 4.5 parts of magnesium hydroxide dispersed in 80 parts of water. Then, the atmosphere inside the reactor was replaced by nitrogen, and the suspension polymerization was carried out at 120°C. for 5 hours under an agitation of 120 rpm, to complete the polymerization. After the resulting reaction mixture was cooled, hydrochloric acid was added thereto to dissolve magnesium hydroxide and to remove it. The reaction product was washed with water and filtered with use of a filter cloth of 200 mesh by means of a centrifugal dehydrator of the basket type, followed by drying. Thus, there was obtained a polymer having a beautiful pearl form (which is designated as "Resin I").

Preparation A-2

A pearl-like polymer was prepared under the same conditions as in Preparation A-1 except that 40 parts of styrene, 30 parts of α-methylstyrene and 30 parts of acrylonitrile were used instead of 72 parts of styrene and 28 parts of acrylonitrile and the bulk polymerization was carried out at 75°C. for 4 hours and 30 minutes. The so formed resin is designated as "resin II".

Preparation A-3

A pearl-like polymer was prepared under the same conditions as in Preparation A-1 except that 15 parts of Diene NF (polybutadiene rubber manufactured by Asahi Kasei) was used instead of Tufden 2000 A. The so formed resin is designated as "Resin III".

Preparation B (Preparation of ABS Resin by Emulsion Polymerization)

A reactor (having capacity of 120 liters) was charged with 25 parts, calculated as the solids, of a polybutadiene latex (Nippol LXMA manufactured by Japan Geon), 72 parts of styrene, 28 parts of acrylonitrile, 20 parts of disproportionated sodium rosinate, 0.2 part of potassium persulfate, 1.0 part of 5-dodecyl mercaptan and 200 parts of water, and the polymerization was carried out in a nitrogen current at 50°C. for 6 hours. The resulting latex was coagulated by a customary method, washed with water and dried to obtain a white powdery resin, which is designated as "Resin IV".

These resins and resin V (JSR-10 manufactured by Japan Synthetic Rubber) and resin VI (MV manufactured by Sumitomo Norgatac), as commercially available ABS resins prepared by the emulsion polymerization method, were tested with respect to their blendability with a polycarbonate.

Each of resins I to VI was pelletized by an extruder having a diameter of 40 mm and was molded into test pieces with use of an injection molding apparatus (cylinder temperature = 225°C.; injection pressure = 800 – 900 kg/cm$^2$; mold temperature = 50°C.). Then, the physical properties and other characteristics were measured. Results are shown in Table 1.

The above resin V (JSR-10) has a monomer composition of 25.2 percent by wt. of acrylonitrile and 74.8 percent by wt. of styrene, and contains 30.8 percent by wt. of polybutadiene based on the total amount of acrylonitrile and styrene. It has a degree of grafting of 43.9 percent. Further, the above resin VI (MV) has a monomer composition of 26.5 percent by wt. of acrylonitrile and 73.5 percent by wt. of styrene, and contains 40.7 percent of polybutadiene based on the total amount of acrylonitrile and styrene. It has a degree of grafting of 40.7 percent.

TABLE 1

| Item | Unit | Measuring Method (ASTM) | Characteristics of Resins | | | | | |
|---|---|---|---|---|---|---|---|---|
| | | | I | II | III | IV | V | VI | Polycarbonate |
| Tensile strength | kg/cm$^2$ | D-638 | 520 | 539 | 328 | 375 | 350 | 368 | 645 |
| Elongation at break | % | D-638 | 9.9 | 34.4 | 16.4 | 46.5 | 21 | 17.1 | 49.3 |
| Flexural yield strength | kg/mm$^2$ | D-790 | 6.7 | 7.1 | 6.9 | 5.1 | 5.0 | 5.2 | 7.5 |
| Flexural elasticity | kg/mm$^2$ | D-790 | 223 | 244 | 218 | 153 | 161 | 150 | 210 |
| Impact strength | kg·cm/cm | D-256 (with notch) | 18.9 | 11.2 | 11.9 | 31.5 | 55.4 | 35.2 | 73.5 |
| Heat distortion temperature | °C | D-648 (load of 18.56 kg/cm$^2$; without annealing) | 77.8 | 90.7 | 79.3 | 76.7 | 74.6 | 76.6 | 134 |
| Melt viscosity | Poise × 10$^{-3}$ | Koka type flow tester; 240°C. | 12 | 35 | 6 | 16 | 20 | 18 | 82 |
| Remarks | | | bulk suspension polymerization | bulk suspension polymerization | bulk suspension polymerization | Emulsion polymerization | JSR-10 commercially available emulsion polymerized product | MV, commercially available emulsion polymerized product | A 2500 manufactured by Idemitsu Petrochemical |

EXAMPLE 1 (BLEND OF POLYCARBONATE AND ABS RESIN)

Resins I to VI obtained in Preparations A and B, and two commercially available ABS resins V and VI prepared by the emulsion polymerization method were blended homogeneously with flaky polycarbonate resins (A 2500 and A 2700 manufactured by Idemitsu Petrochemical), and blends were kneaded by an extruder or a Banbury mixer. The polycarbonate resins A 2500 and A 2700 are both polycarbonates of 2,2-(4,4'-dihydroxy-diphenyl)-propane prepared by phosgene method and have molecular weights of 25,000 (A 2500) and 27,000 (A 2700), respectively. The resulting pellets were molded into test pieces with use of an injection molding apparatus (cylinder temperature of 230°C; injection pressure of 800 – 900 kg/cm$^2$; mold temperature of 50°C), and the physical properties of the resulting test pieces were measured. The results are shown in Table 2. In Table 2, only the results of tests made on blends of each of resins I to VI with polycarbonate A 2500 (medium viscosity grade) are shown. Similar results were obtained in tests made on blends of ABS resins with polycarbonate A 2700 (high viscosity grade).

Table 2

| Resin Used | Mixing Ratio (weight basis) | Kneading Method |
|---|---|---|
| Resin I : PC | 50 : 50 | extruder |
| Resin I : PC | 50 : 50 | Banbury mixer at 220°C. for 1 minute and 30 seconds |
| Resin II : PC | 70 : 30 | extruder |
| Resin II : PC | 70 : 30 | Banbury mixer at 220°C. for 1 minute and 30 seconds |
| Resin III : PC | 50 : 50 | extruder |
| Resin III : PC | 50 : 50 | Banbury mixer at 220°C. for 1 minute and 30 seconds |
| Resin IV : PC | 50 : 50 | extruder |
| Resin IV : PC | 50 : 50 | Banbury mixer at 220°C. for 1 minute and 30 seconds |
| Resin IV : PC | 50 : 50 | Banbury mixer at 220°C. for 5 minutes |
| Resin V : PC | 50 : 50 | extruder |
| Resin V : PC | 50 : 50 | Banbury mixer at 220°C. for 1 minute and 30 seconds |
| Resin V : PC | 50 : 50 | Banbury mixer at 220°C. for 3 minutes |
| Resin V : PC | 50 : 50 | Banbury mixer at 220°C. for 5 minutes |
| Resin VI : PC | 50 : 50 | extruder |
| Resin VI : PC | 50 : 50 | Banbury mixer at 220°C. for 1 minute and 30 seconds |
| Resin VI : PC | 50 : 50 | Banbury mixer at 220°C. for 5 minutes |

Table 2-Continued

| Physical Properties | | | | Remarks |
|---|---|---|---|---|
| Tensile strength kg/cm$^2$ | Impact strength kg·cm/cm | Heat distortion temp. °C. | Melt viscosity at 240°C. poise × 10$^{-3}$ | |
| 663 | 60.0 | 88.7 | 32 | |
| 637 | 59.8 | 94.7 | 30 | |
| 630 | 45.2 | 99.2 | 29 | |
| 644 | 46.3 | 98.9 | 27 | |
| 657 | 75.8 | 92.1 | 32 | |
| 664 | 80.6 | 91.5 | 35 | |
| 519 | 7.0 | 88.2 | 34 | |
| 502 | 6.5 | 89.1 | | |
| 493 | 52.1 | 89.7 | 30 | colored brown considerably |
| 537 | 5.2 | 89.7 | 42 | |
| 474 | 6.0 | 90.2 | 40 | |
| 482 | 8.5 | 88.5 | 37 | colored brown slightly |
| 495 | 66.0 | 87.4 | 37 | colored brown considerably |
| 544 | 13.4 | 88.2 | 40 | |
| 540 | 12.2 | 89.0 | 37 | |
| 551 | 54.1 | 89.3 | 39 | colored brown considerably |

Notes:
PC; polycarbonate (A 2500 manufactured by Idemitsu Petrochemical)
Extruder; diameter of 40 mm, L/D = 28, CR = 24
Banbury mixer: capacity = 5 liters, treated for 2 minutes with a roll mill after kneading with Banbury mixer

EXAMPLE 2 (FLAME-RESISTANT ABS RESIN)

From the results of Example 1 it was found that the compatibility of an ABS resin prepared by bulk suspension polymerization with a polycarbonate is much better than the compatibility of an ABS resin prepared by emulsion polymerization with a polycarbonate. Therefore, in view of the heat history, it was considered that it might be possible to obtain a flame-retarding effect by incorporating a flame retardant into such ABS resin prepared by bulk suspension polymerization. Accordingly, such ABS resin was incorporated with various commercially available flame retardants, and tests were effected on the resulting compositions. Results of some instances of such tests are shown in Table 3. A prescribed amount of a flame retardant was added when a pearl-like polymer obtained from bulk suspension polymerization was blended with the flaky polycarbonate, and the resulting mixture was blended by means of a simple blender such as a crusher, pelletized by an extruder and formed into test pieces by means of a molding apparatus under the same conditions as described above. Then, the physical properties of the test pieces were determined. A comparative sample 7 was prepared by employing the resin V and conducting the kneading at 220°C. for 5 minutes with use of a Banbury mixer.

Table 3

| Sample No. | 1 | 2 | 3 | 4 |
|---|---|---|---|---|
| | | This Invention | | |
| Mixing Ratio | | | | |
| Resins | | | | |
| Resin I | 50 | 50 | 50 | |
| Resin II | | | | 70 |
| PC | 50 | 50 | 50 | 30 |
| Flame Retardants | | | | |
| TBA (*) | 10 | 10 | 10 | 10 |
| DCB (**) | | 10 | 10 | |
| antimony trioxide | | | 5 | |

Table 3—Continued

| Sample No. | This Invention | | | | This Invention | | Comparison |
| --- | --- | --- | --- | --- | --- | --- | --- |
| | 1 | 2 | 3 | 4 | 5 | 6 | 7 |
| | | | | | | | 50 (Resin V) |
| | | | | | 70 | 70 | |
| | | | | | 30 | 30 | 30 (PC) |
| | | | | | 10 | 10 | 10 (TBA) |
| | | | | | 10 | 10 | 10 (DCB) |
| | | | | | | 5 | 5 (antimony trioxide) |
| Physical Properties | | | | | | | |
| tensile strength, kg/cm² | 655 | 700 | 693 | 640 | 653 | 663 | 430 |
| elongation, % | 25.2 | 9.1 | 4.9 | 23.4 | 18.8 | 15.4 | 3.1 |
| impact strength, kg·cm/cm | 60.3 | 38.3 | 14.1 | 43.5 | 21.2 | 12.6 | 12 |
| heat distortion temperature, °C. | 92.1 | 85.0 | 84.6 | 98.4 | 90.7 | 89.1 | 82 |
| melt viscosity, poise × 10⁻³ | 15 | 6 | 6 | 25 | 15 | 12 | 9 |
| Appearance | good | good | good | good | good | good | bad, colored dark brown |
| Combustibility Test | | | | | | | |
| method A (seconds) | 60 | 10 | 0.5 | 60 | 8 | 0.8 | 60 |
| method B (seconds) | 60 | 5 | 0.3 | 60 | 6 | 0.7 | 60 |

(\*) TBA: Tetrabromo-bisphenol A
(\*\*) DCB: Decabromobiphenyl
Notes: Combustion test method
Test piece; ½" × ¼" × 6"
Ignition; test piece was held vertically along the long axis and the lower part was contacted with fire
evaluation of self-extinguishing property;
Method A; fire was taken away after 10 seconds' ignition and the time (seconds) required for self-extinguishing was counted; the test was repeated twice, and the average value of the two tests is shown
Method B; fire was taken away after 5 seconds' ignition, and on self-extinguishing the test piece was contacted with fire again; this procedure was repeated four times; time (seconds) required for self-extinguishing at 4th ignition was counted.

In Table 3, there are shown results of effective combinations of flame retardants selected from various combinations. Especially, compositions of samples 3 and 6 have sufficient physical properties required of an impact-resistant resin and are excellent in heat resistance and flame resistance. Therefore, these compositions are very unique resinous compositions.

The embodiments of the invention in which an exclusive property, or privilege is claimed or defined as follows:

1. A blended resinous composition, in which the resin constituents of said composition consist essentially of (1) from 30 to 75 percent by weight of a graft copolymer prepared by bulk suspension polymerization of polybutadiene or a copolymer comprising butadiene, as the rubber component, and a vinyl cyano compound and a vinyl aromatic compound as the monomer component, and (2) the balance of said resin constituents is a polycarbonate of a di-(monohydroxyphenyl)-substituted aliphatic hydrocarbon.

2. A fire-resistant blended resinous composition, in which the resin constituents of said composition consist essentially of (1) from 30 to 75 percent by weight of a graft copolymer prepared by bulk suspension polymerization of polybutadiene or a copolymer comprising butadiene, as the rubber component, and a vinyl cyano compound and a vinyl aromatic compound as the monomer component, (2) the balance of said resin constituents is a polycarbonate of a di-(monohydroxyphenyl)-substituted aliphatic hydrocarbon, said composition also containing an effective amount of (3) a halogenated hydrocarbon flame-retardant compound.

3. The composition of claim 2 further containing antimony trioxide.

4. A fire resistant blended resinous composition according to claim 2 in which said graft copolymer is prepared by bulk suspension polymerization of a polybutadiene rubber or a rubber butadiene-styrene copolymer and a mixture of acrylonitrile and styrene.

5. A fire resistant composition according to claim 4 wherein the flame retardant compound is selected from the group consisting of tetrabromo-bisphenol A and decachlorobiphenyl and mixtures thereof.

6. A fire resistant composition according to claim 5 wherein the flame retardant consists of 1 to 20 parts by weight of tetrabromo-bisphenol A, 0 to 20 parts by weight of decachlorobiphenyl and 1 to 20 parts by weight of antimony trioxide per 100 parts by weight of the blend of the graft copolymer and the polycarbonate.

7. The composition of claim 1 in which the graft copolymer is a butadiene-styrene copolymer rubber on which is graft polymerized styrene and acrylonitrile in the weight ratio of 2 – 20 : 65 – 85 : 15 – 35, respectively.

8. The composition of claim 1 in which the graft copolymer is a butadiene-styrene copolymer rubber on which is graft polymerized styrene-α-methylstyrene and acrylonitrile in the weight ratio of 2 – 20 : 65 – 85 : 15 – 35, respectively.

9. The composition of claim 1 in which the graft copolymer is a polybutadiene rubber on which is graft polymerized styrene and acrylonitrile in the weight ratio of 2 – 20 : 65 – 85 : 15 – 35, respectively.

10. The composition of claim 5 in which the graft copolymer is a butadiene-styrene copolymer rubber on which is graft polymerized styrene and acrylonitrile in the weight ratio of 2 – 20 : 65 – 85 : 15 – 35, respectively.

11. The composition of claim 5, in which the graft copolymer is a butadiene-styrene copolymer rubber on which is graft polymerized styrene-α-methylstyrene and acrylonitrile in the weight ratio of 2 – 20 : 65 – 85 : 15 – 35, respectively.

12. The composition of claim 6, in which the graft copolymer is a butadiene-styrene copolymer rubber on which is graft polymerized styrene and acrylonitrile in the weight ratio of 2 – 20 : 65 – 85 : 15 – 35, respectively.

13. The composition of claim 6 in which the graft copolymer is a butadiene-styrene copolymer rubber on which is graft polymerized styrene-α-methylstyrene and acrylonitrile in the weight ratio of 2 – 20 : 65 – 85 : 15 – 35, respectively.

14. A blended resinous composition comprising (1) 75 to 30 percent by weight of a graft copolymer prepared by bulk suspension polymerization of polybutadiene or butadiene-styrene copolymer rubber, as the rubber component, and acrylonitrile and styrene as the monomer component, (2) 25 to 70 percent by weight of a polycarbonate of 2,2-(4,4'-dihydroxy-diphenyl) propane.

15. The composition of claim 14 further containing a fire retardant consisting of 1 to 20 parts by weight of tetrabromo-bisphenol A, 0 to 20 parts by weight of decachlorobiphenyl and 1 to 20 parts by weight of antimony trioxide per 100 parts by weight of the blend of the graft copolymer and the polycarbonate.

* * * * *